(12) United States Patent
Custer et al.

(10) Patent No.: US 7,201,036 B2
(45) Date of Patent: Apr. 10, 2007

(54) RESIDUAL LIFE INDICATING SYSTEM

(75) Inventors: John P. Custer, Stow, OH (US); Kenneth L. Kessler, Streetsboro, OH (US); Reuben Harel, Solon, OH (US); John L. Creed, Girard, OH (US)

(73) Assignee: Hunter Manufacturing Co., Solon, OH (US)

( * ) Notice: Subject to any disclaimer, the term of this patent is extended or adjusted under 35 U.S.C. 154(b) by 0 days.

(21) Appl. No.: 11/065,417

(22) Filed: Feb. 24, 2005

(65) Prior Publication Data

US 2005/0188749 A1 Sep. 1, 2005

Related U.S. Application Data

(60) Provisional application No. 60/548,377, filed on Feb. 27, 2004.

(51) Int. Cl.
*G01N 37/00* (2006.01)

(52) U.S. Cl. .................... 73/31.02; 73/31.03

(58) Field of Classification Search .................... None
See application file for complete search history.

(56) References Cited

U.S. PATENT DOCUMENTS

| | | |
|---|---|---|
| 4,135,896 A | 1/1979 | Parish et al. |
| 4,828,589 A | 5/1989 | Bauer et al. |
| 5,036,698 A | 8/1991 | Conti |
| 5,089,144 A | 2/1992 | Ozkahyaoglu et al. |
| 5,150,604 A | 9/1992 | Succi et al. |
| 5,334,237 A | 8/1994 | Lorimer |
| 5,992,216 A * | 11/1999 | Wang et al. ............... 73/28.01 |
| 6,287,023 B1 * | 9/2001 | Yaegashi et al. ............ 396/565 |
| 6,379,407 B1 * | 4/2002 | Blackwell et al. ......... 55/282.3 |
| 2002/0112605 A1 * | 8/2002 | Motouji et al. .................. 95/8 |

OTHER PUBLICATIONS

Microsensors, Micro Analytical: Preconcentrator (Stage One), www.sandia.gov/mstc/technologies/microanalytical/preconcentrator.html Feb. 26, 2004 (1 page).
Microsystems Products, Micro Explosives Detector Review, www.sandia.gov/mstc/products/usystemsprod/index.html Feb. 24, 2005 (4 pages).

* cited by examiner

*Primary Examiner*—Hezron Williams
*Assistant Examiner*—Paul M. West
(74) *Attorney, Agent, or Firm*—Fay Sharpe LLP

(57) ABSTRACT

A residual life indicating system for a filter includes a main filter, a sampling filter, and a sensor. Both the main filter and the sampling filter receive an ambient gas meant to be filtered. The sensor connects to the sampling filter and senses the presence of a predetermined chemical in the gas that has been filtered by the sampling filter.

27 Claims, 15 Drawing Sheets

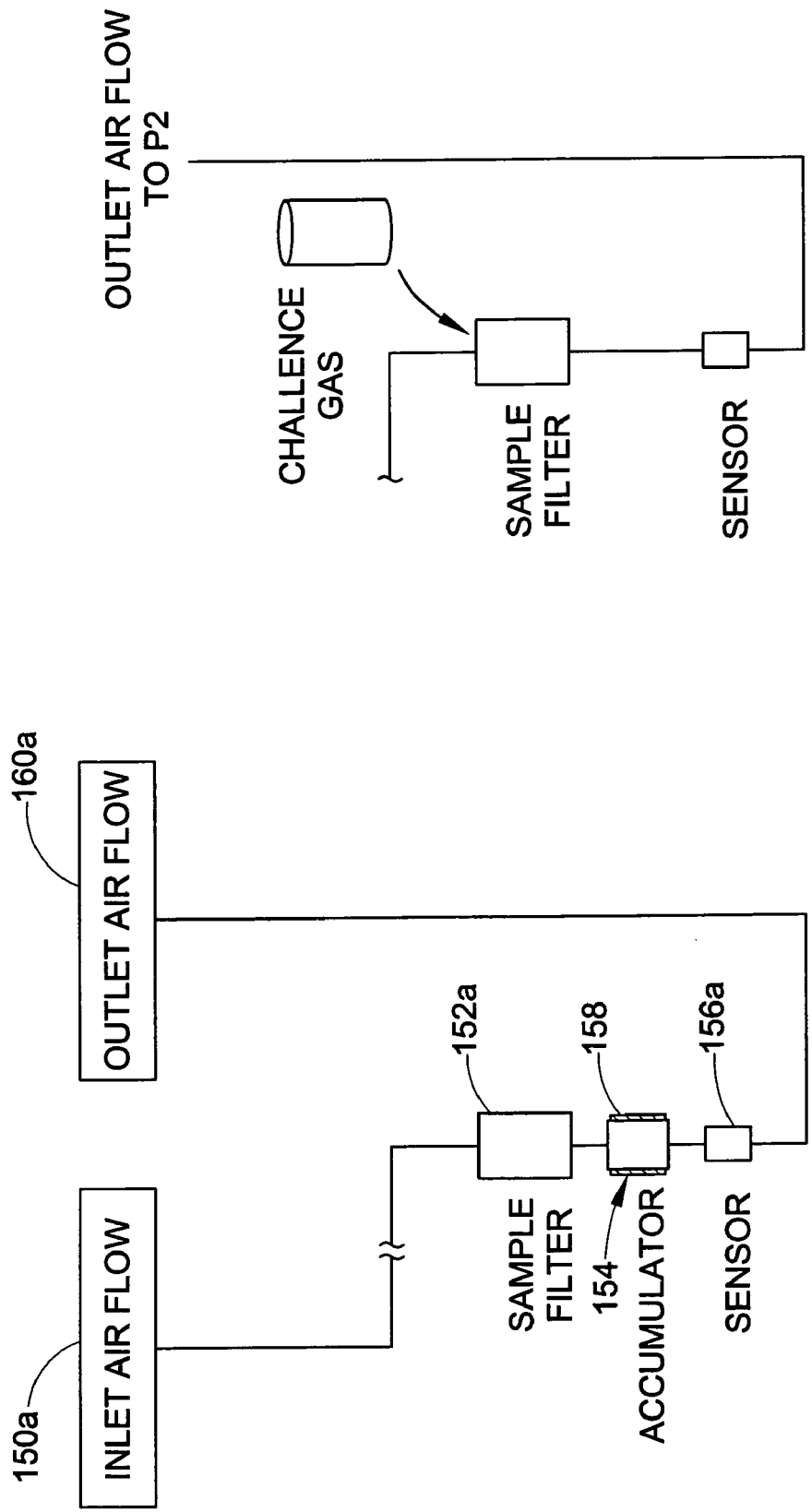

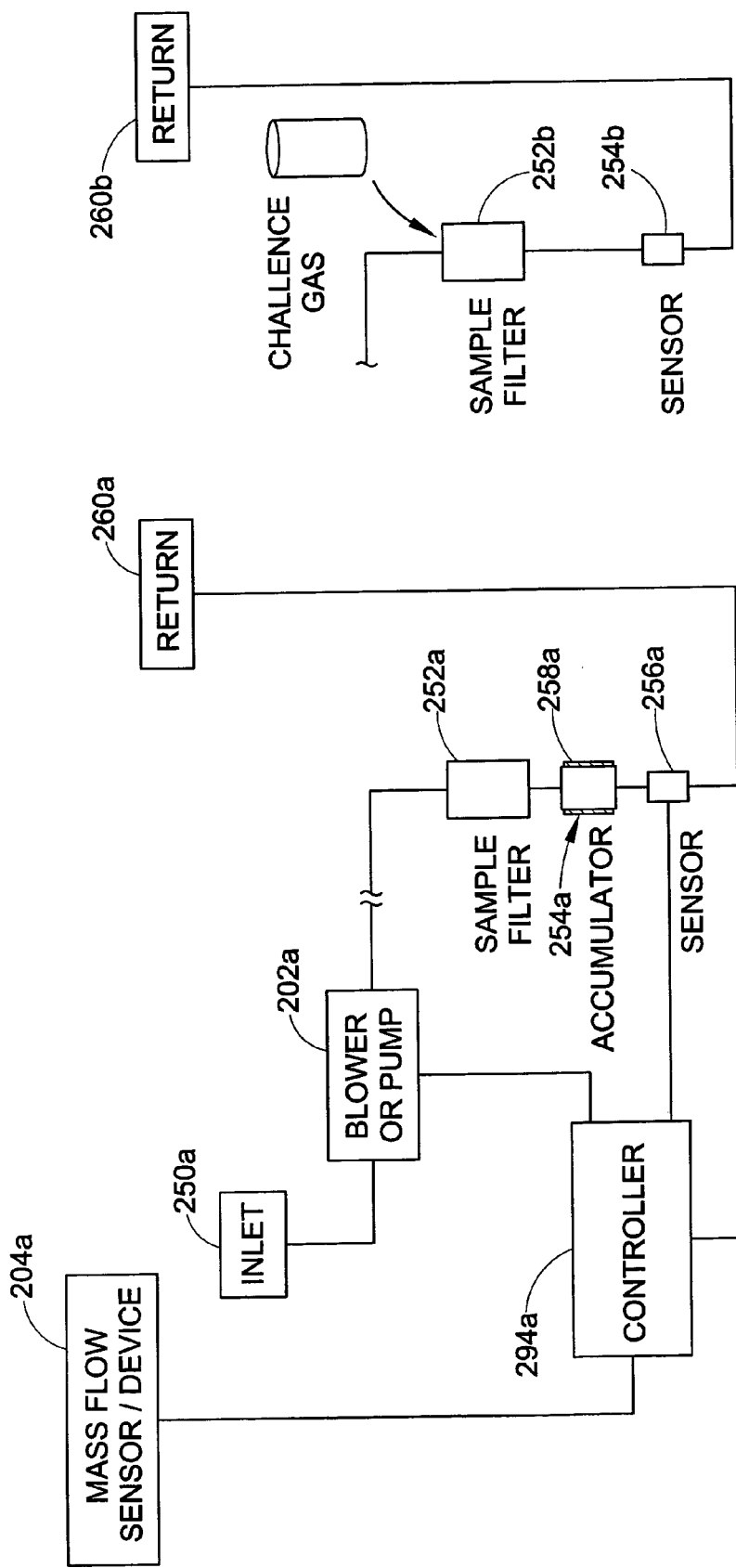

RESIDUAL LIFE INDICATING SYSTEM

This application claims priority of Provisional Patent Application Ser. No. 60/548,377, filed Feb. 27, 2004, entitled "Residual Life Indicating System."

The present invention relates to gas purifiers. More specifically, the invention relates to a system to monitor the filter bed in a gas purifier to indicate how much filter life remains and when the filter should be changed.

BACKGROUND OF THE INVENTION

Most air purification filters work by trapping contaminants. Contaminants can include particles such as dust, or biological or chemical contaminants in vapor form. Filters contain numerous "free sites". As contaminants attach to the filter, these free sites become occupied and exhausted. When a large proportion of free sites are exhausted, the filter is no longer effective in removing 100% of the contaminants from the air stream. Therefore the filter must be changed. Determining when a significant number of sites is exhausted and when a filter must be changed is a difficult task.

Historically, most filter change guidelines have been based on time in service. Under this method filters are changed after they have been in service for a certain period of time. This method can result in filters being changed early or late depending on the speed of airflow and the level of contamination in the air stream.

Other prior art systems that determine at which time a filter should be changed use a sample canister. One such example is disclosed in U.S. Pat. No. 4,135,896, incorporated herein by reference in its entirety. Sample canisters can attach to outlet ends of a housing of a filter bed. Rather than flowing through filter beds, a small portion of contaminated gas passes through the sample canister. The sample canister includes a filter bed having a width that is equal to or slightly less than the width of the gas purifier filter bed. Accordingly an exhaustion of free sites in the sample canister should coincide with an exhaustion of free sites in the gas purifier filter bed, everything else being equal.

One problem with the above-mentioned indicating system is that the contaminated air must enter the filter housing before entering the sample canister for the indicating system to work. Furthermore, the volume of contaminated air passing through the canister may not be proportional to the volume of air passing through the filter media. This could result in false comparisons between the number of free sites remaining in the filter bed of the filter being monitored and the number of free sites remaining in the sample canister's filter bed.

Accordingly, it is desirable to provide an air purification assembly including a system that can perform the following functions: monitor the filter bed, indicate how much filter life remains and determine when the filter should be changed. It is also desirable to provide a residual life indicating system that can be used with different types of air purification systems.

SUMMARY OF THE INVENTION

In accordance with a first embodiment of the invention, a residual life indicating system for a filter includes a main filter, a sampling filter, and a sensor. Both the main filter and the sampling filter receive an ambient gas meant to be filtered. The sensor connects to the sampling filter and senses the presence of a predetermined chemical in the gas that has been filtered by the sampling filter.

In accordance with another embodiment of the invention, a residual life indicating system for a filter in a gas purification assembly includes a main filter, a sampling filter spaced from the main filter, an accumulator located downstream from the sampling filter, and a sensor connected to the accumulator. The sampling filter and the main filter each receive an ambient gas meant to be filtered. The accumulator is in fluid communication with the sampling filter. The sensor senses the presence of a predetermined chemical in the gas that has been filtered by the sampling filter and has entered the accumulator.

In yet another embodiment of the invention, an air purification assembly includes an air flow path, an air pressurizing member, a main filter, a sampling filter, and a sensor. The air pressurizing member is located in the air flow path and supplies pressurized ambient air. The main filter is located in the flow path and filters the pressurized ambient air flowing along the air flow path. The sampling filter is in fluid communication with the air flow path via an orifice for sampling the pressurized ambient air. The sensor communicates with the sampling filter for sensing the presence of a predetermined chemical in the air exiting the sampling filter.

In yet another embodiment of the invention, a residual life indicating system for a filter includes a main filter, a sampling filter, a supply of pressurized challenged gas, a conduit for connecting the challenged gas supply to the sampling filter, a regulator for regulating a flow of the challenged gas to the sampling filter, and a sensor located downstream from the sampling filter. The main filter and the sampling filter both receive an ambient gas meant to be filtered. The sensor senses the presence of a predetermined chemical in the gas which has been filtered by the sampling filter.

BRIEF DESCRIPTION OF THE DRAWINGS

The invention may take form in certain components and structures, preferred embodiments of which will be illustrated in the accompanying drawings.

FIGS. 7A and 7B are schematic views of an alternative residual life indicating system according to the present invention.

FIGS. 8A and 8B are also schematic views of still another embodiment of a residual life indicating system according to the present invention.

DETAILED DESCRIPTION OF THE INVENTION

Figure 1:
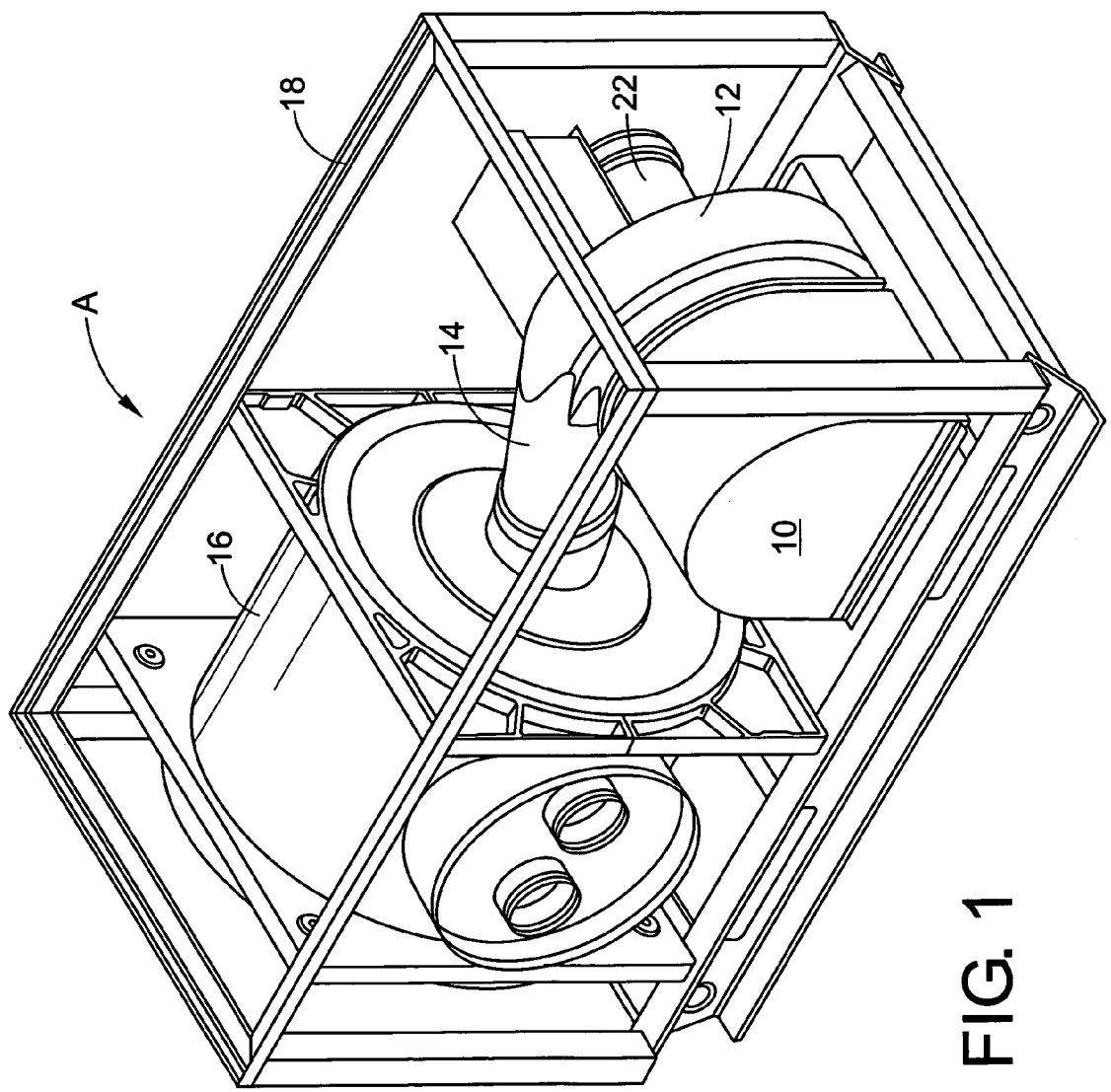
FIG. 1 is a perspective view of a gas purification assembly of the kind with which the inventive residual life indicating system can be employed.
Figure 3:
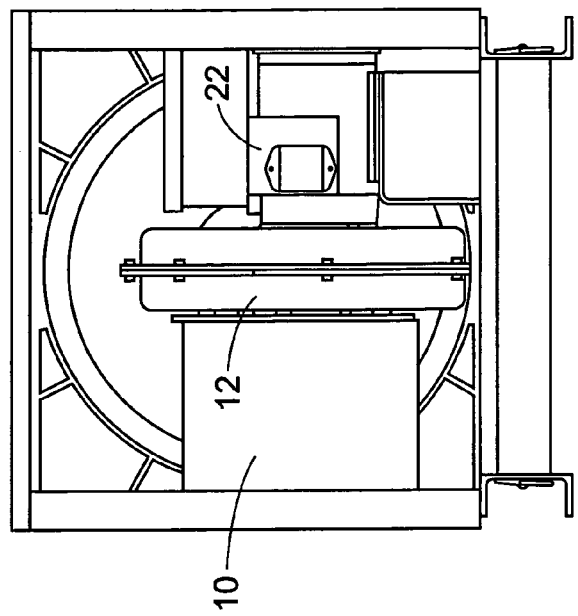
FIG. 3 is a reduced end elevational view of the gas purification assembly of FIG. 1.
Figure 2:
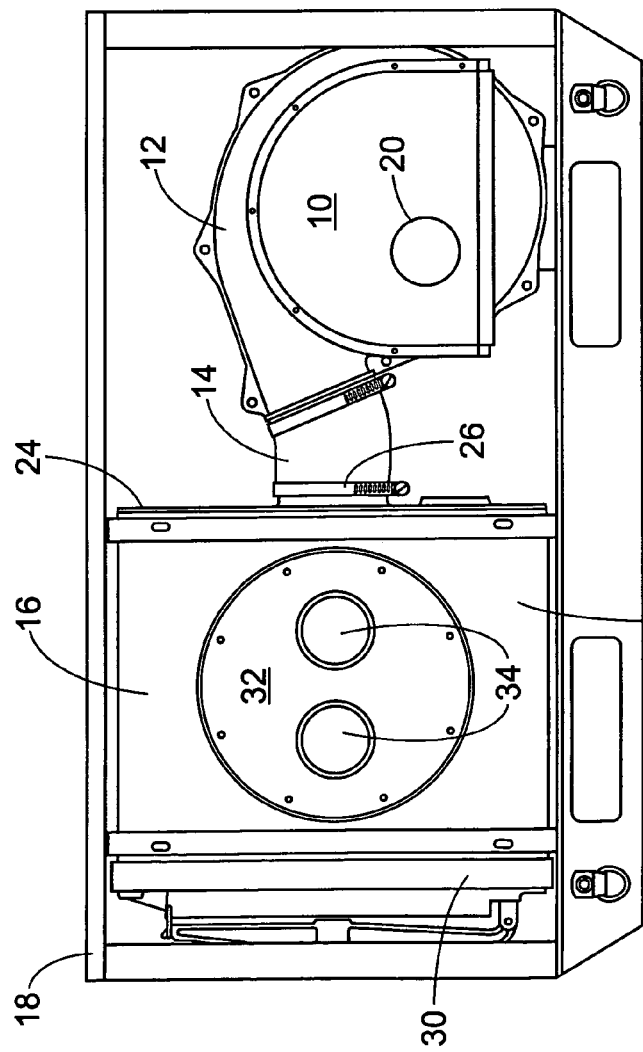
FIG. 2 is a reduced side elevational view of the gas purification assembly of FIG. 1.

Referring now to the figures, wherein the showings are for purposes of illustrating preferred embodiments of the invention only and not for purposes of limiting the same, the figures illustrate an air purification assembly including a system to monitor the life remaining in a filter bed of the air purification assembly. The air purification assembly disclosed in the figures is discussed herein in order to explain an environment in which the residual life indicating systems according to the present invention can be used. Referring now to FIGS. 1–3, an air purification assembly A is disclosed. In one embodiment, the air purification assembly disclosed is an FFA400 filter assembly available from the Hunter Manufacturing Company, Solon, Ohio. Of course, it should be recognized that the residual life indicating systems discussed herein can be used with any type of air purification system that employs a filter to trap contaminants.

With reference to FIG. 1, the air purification assembly A includes an inlet housing 10, a blower housing 12, an air supply inlet hose 14, and a filter housing 16. Generally, contaminated air enters the inlet housing 10 and passes through the blower housing 12 to the air supply inlet hose 14 and into the filter housing 16 where the air is purified. The air purification assembly includes a structural frame 18 to which the housings are mounted. The structured frame 18 allows the assembly A to be lifted, by a forklift for example, and transported as a single unit.

With reference now to FIG. 2, the inlet housing 10 defines a contaminated air inlet 20 sized to receive an amount of contaminated air that the filters employed in the filter housing 16 can purify. The inlet housing communicates with the blower housing 12.

The blower housing 12 houses a blower (not shown). The blower can comprise a conventional fan or the like. The blower is operatively connected to a blower motor 22 (FIG. 3), which drives the blower. The motor 22 rotates the blower to create a vacuum in the blower housing 12 so that air is drawn from the inlet housing 10 into the blower housing 12. The blower housing 12 communicates with the air supply inlet hose 14 to provide a passageway for the contaminated air to flow from the blower housing 12 to the filter housing 16.

The filter housing 16 includes a first sidewall 24 defining a filter housing inlet 26, a second sidewall 30 and a peripheral wall 28 that spans the sidewalls 24 and 30. The peripheral wall 28 includes a port 32 which defines air outlet ducts 34.

Figure 4:
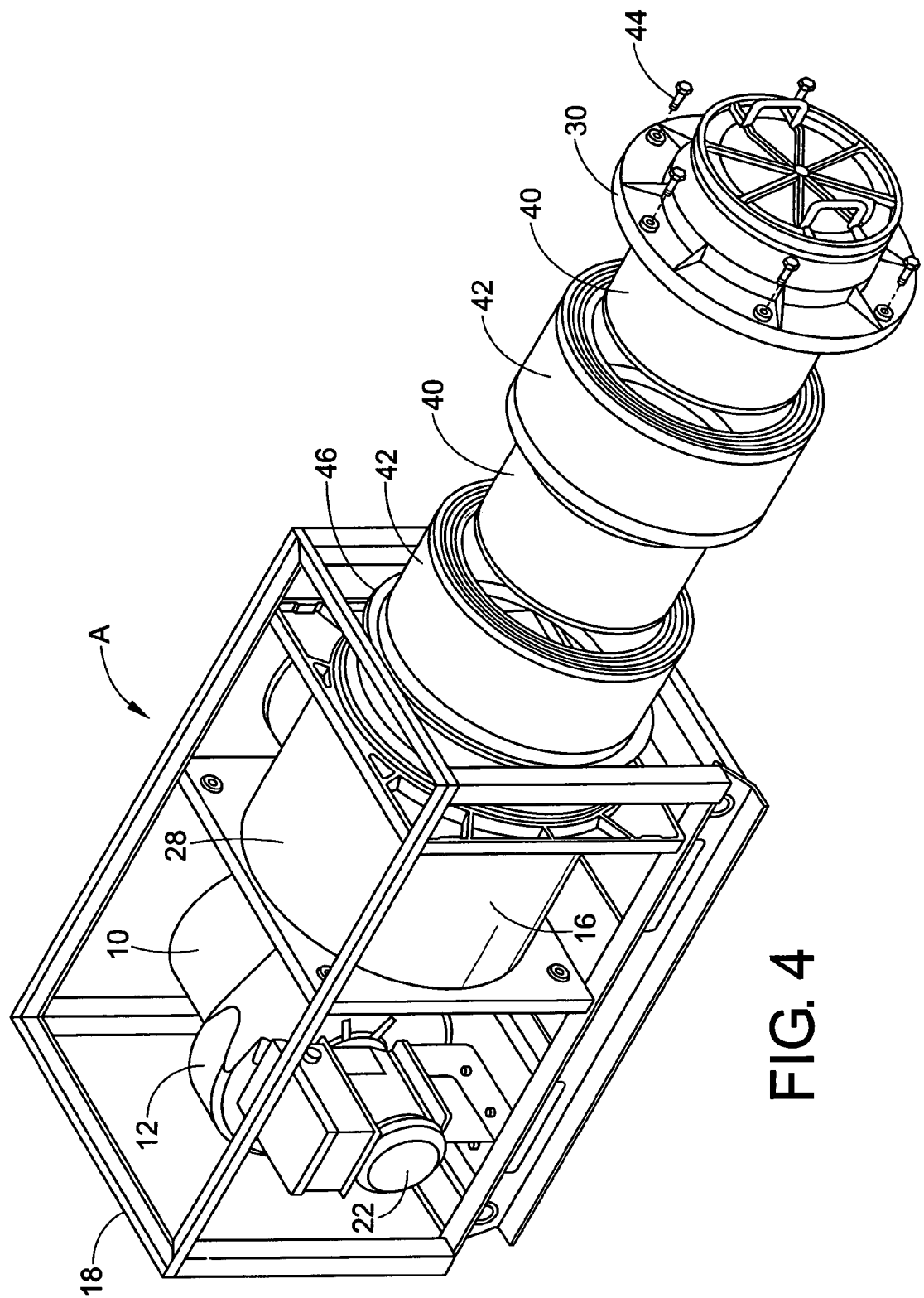
FIG. 4 is a reversed partially exploded perspective view of the gas purification assembly of FIG. 1.

Referring now to FIG. 4, the filter housing 16 houses a plurality of filters. High efficiency particulate arrest (HEPA) filters 40 are received inside carbon filters 42 mounted in the filter housing 16. The filter sets disclosed are M98 filters available from the Hunter Manufacturing Company of Solon, Ohio. It should be recognized, of course, that other gas and particulate filter sets can be used with the present invention. Furthermore, the filters need not be toroidal or cylindrical as depicted in the figures. Instead, the filters could be rectangular, square, pleated or of any other desired shape.

To install the filters 40, 42 the second sidewall 30 is removed from the peripheral wall 28. The carbon filters 42 are then placed inside the peripheral wall 28 and the HEPA filters 40 are placed inside the carbon filters 42. The second sidewall 30 is then attached to the peripheral wall 28 using fasteners 44. A gasket 46 can be interposed between the sidewall 30 and the peripheral wall 28 to ensure an airtight seal. Contaminated gas enters the filter housing inside the HEPA filter 40. The gas must then pass through both the HEPA filter 40 and the carbon filter 42 before reaching the air outlet ducts 34 (FIG. 2).

A residual life indicating system according to the present invention determines the service life available for at least one of the filters 40, 42 residing in the filter housing. Specifically, the residual life indicating system can determine the amount of life remaining in the carbon filter 42. However, it should be recognized that the residual life indicating system according to the present invention could be modified to determine the amount of life remaining in the HEPA filter, or any other type of known filter.

FIGS. 5A–5H disclose systems for determining the remaining life in the filters of a filter assembly similar to the assembly disclosed in FIGS. 1–4. The embodiments disclosed in FIGS. 5A–5H are only a few of many possible embodiments of a residual life indicating system for a filter assembly. The embodiments depicted in FIGS. 5A–5H are somewhat related to each other as well as related to the embodiment of an air purification assembly depicted in FIGS. 1–4, accordingly like components will be referred to with like numerals and a suffix will be added that corresponds with the figure number.

Figure 5A:
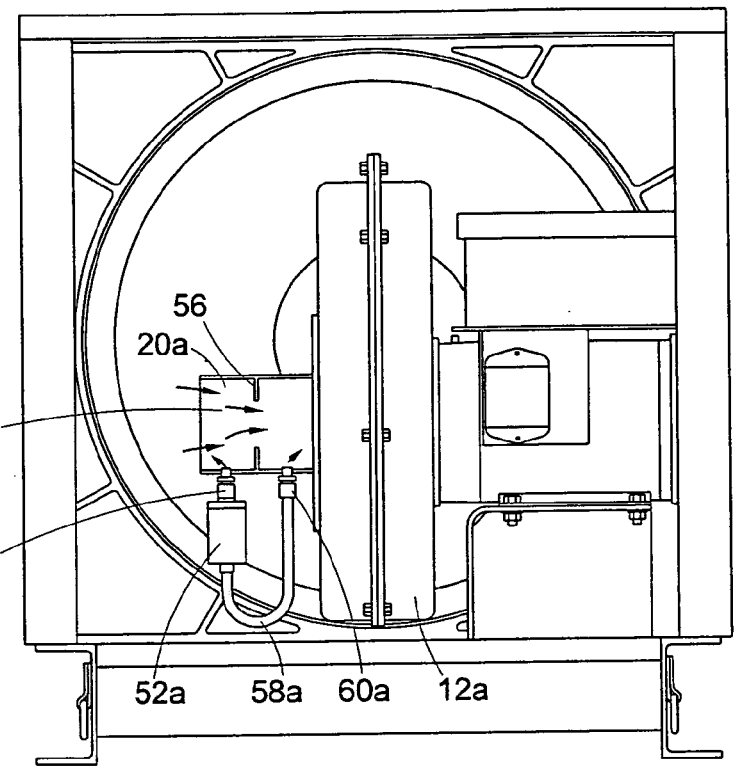
FIGS. 5A–5E are end elevational views partially in cross-section of the gas purification assembly of FIG. 1 including different embodiments of a residual life indicating system according to the present invention mounted thereto.

Referring now to FIG. 5A, a residual life indicating system generally referred to as a vacuum/pull/mass flow system is disclosed. In this embodiment, a tap 50a is disposed upstream of a constriction 54a located near and downstream a contaminated air inlet 20a of an air purification assembly. In this embodiment, the constriction 54a is located upstream of the blower housing 12a. The constriction is formed by, for example, a pair of baffles 56, a ring or similar structures. The tap 50a communicates with a sample canister 52a the specifics of which will be described in more detail below. The canister 52a communicates with a tube 58a that communicates with a nipple 60a. Mass flow across the constriction 54a creates a pressure drop or vacuum. The vacuum serves to pull air through the sample canister 52a. Discharged canister air is reintroduced into the assembly air stream via the tube 58a and the nipple 60a. The discharged canister air is then scrubbed by the air purification assembly filters.

Figure 5B:
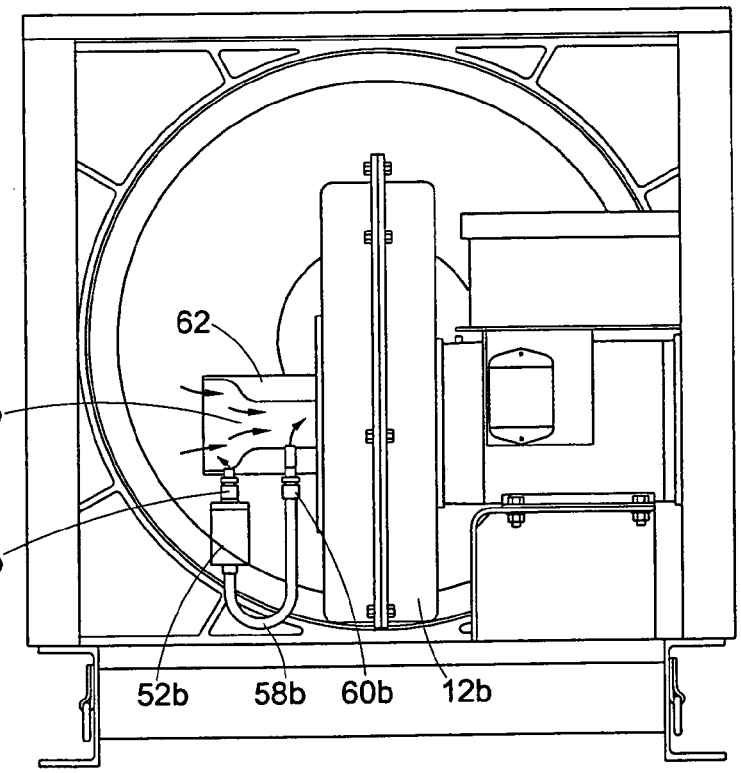

Referring now to FIG. 5B, an alternate configuration of a vacuum/pull/mass flow system is disclosed. In this embodiment, a constriction 54b is formed by a venturi throat 62 disposed upstream from a blower housing 12b. A tap 50b is disposed upstream from the constriction 54b. A vacuum is created across the venturi throat 62 and air is diverted and pulled through the tap 50b into a sample canister 52b. The air exits the canister 52b and enters a tube 58b re-entering the air stream of the assembly via a nipple 60b disposed downstream from the constriction 54b.

Figure 5C:
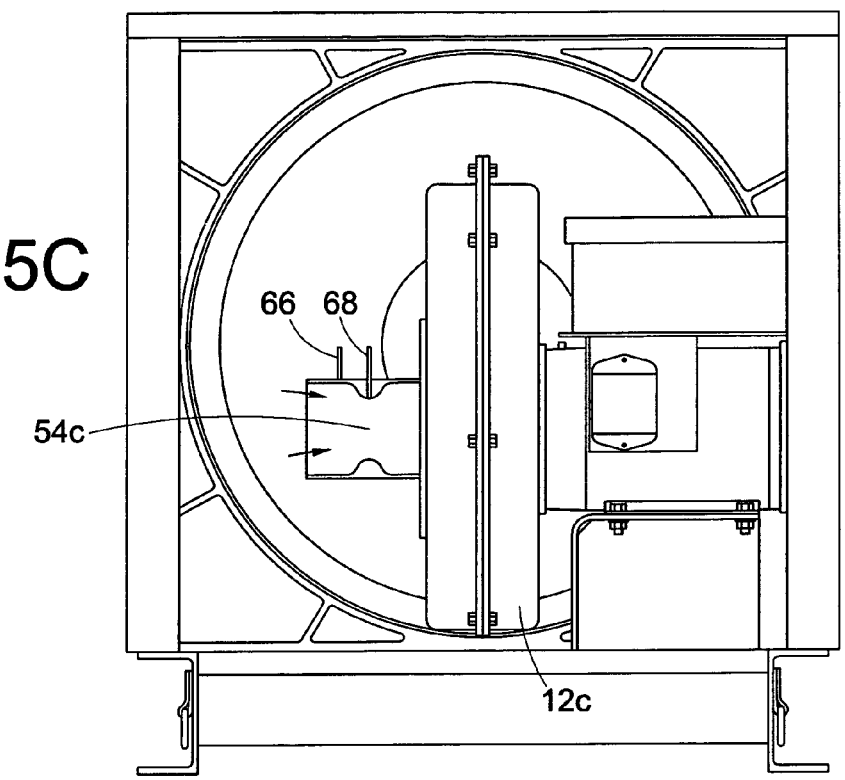

Referring to FIG. 5C, an alternative contaminated air inlet throat design leading to a residual life indicator system is disclosed. A constriction 54c in this embodiment is venturi throat 64 similar to the throat shown in FIG. 62 is shown in FIG. 5B. Air enters a sample canister (not shown) via conduit 66 and reenters the system via conduit 68. In this embodiment, the reentry conduit 68 is located at the constriction 54c, which is similar to FIG. 5B; however, the throat flares outwardly again before entering a blower housing 12c.

Figure 5D:
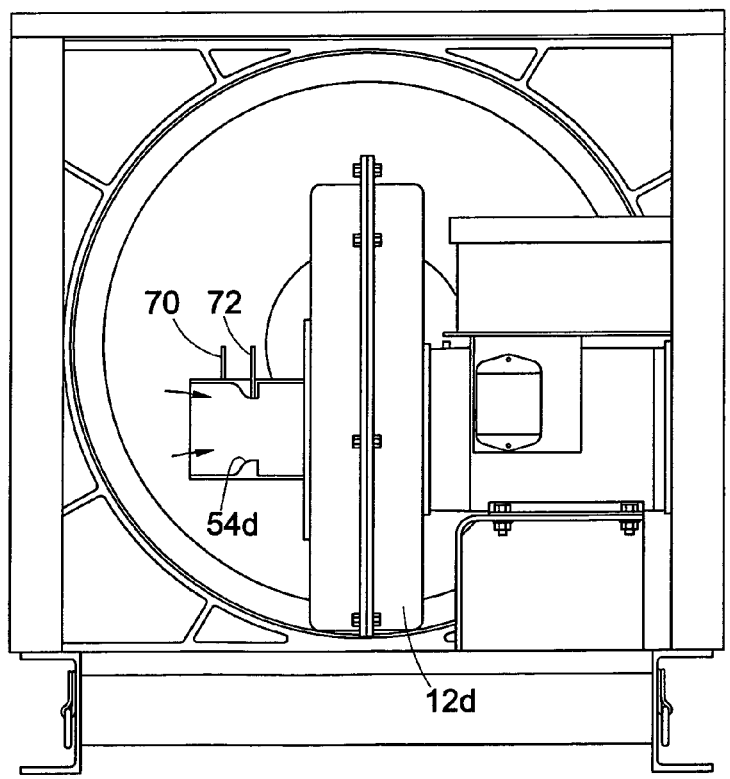

Referring to FIG. 5D, another alternative throat design is shown where the throat has a bell shape. Instead of a smooth transition at a constriction, the throat in FIG. 5D flares abruptly at the constriction 54d substantially perpendicular to a longitudinal axis of the throat. The air enters a sample canister (not shown) via conduit 70 and reenters the system via conduit 72 before entering a blower housing 12d. Conduit 72 is located at or slightly before the transition from the constriction 54d to the flared portion.

Figure 5E:
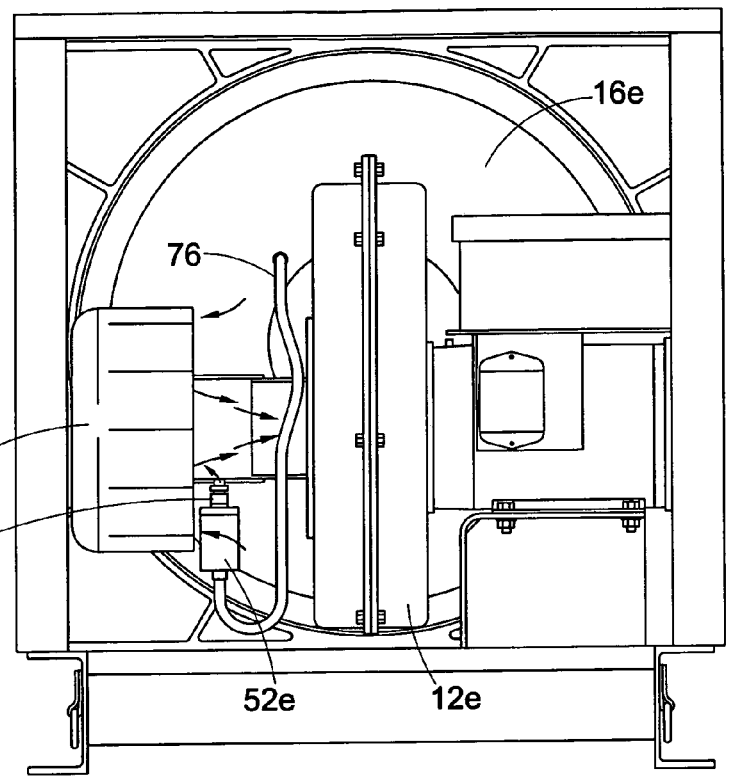

Referring now to FIG. 5E, still another embodiment of the present invention is there illustrated. In this embodiment, a particulate separator 74 is positioned near the contaminated air inlet (not visible). The particulate separator 74 removes dust and coarse particles from the contaminated air stream prior to entry of the air stream into a filter housing 16e and thus increases the HEPA filter's life. The pressure drop across the particulate separator 74 can vary in proportion to the pressure drop across the HEPA and carbon filters 40 and 42 (FIG. 4). Contaminated air enters the particulate separator 74 before moving into a blower housing 12e. A portion of the inlet air is siphoned off through a tap 50e into a sample canister 52e. The air exits the canister via an exit line 76 bypassing the blower housing 12e and connecting to the filter housing 16e.

The particulate separator can include any known apparatus that removes dust and coarse particles from the air stream. Two examples of such particulate separators include a mechanical separator having moving parts and a stationary separator having no moving parts. FIGS. 6A–6E disclose a known particulate separator 74 having moving parts. Air enters through recessed vanes (not shown) in a bottom wall 78 of the particle separator 74. A curved particle accelerator rotor assembly 80 rotates much faster than the incoming air. Debris is captured and passed down the length of the particle accelerator rotor assembly 80 toward straked appendages 82. Debris is deposited on an inner wall 84 of the separator chamber 74. The particle accelerator 80 spins separated debris towards an ejection slot 86 where the debris is ejected. Clean air continues to spin upwardly until it is redirected and flows towards a clean air outlet opening 88 in the bottom wall 78. Obviously, the exact orientation of the separator chamber 74 can change, as seen in FIG. 5D, where the separator chamber is mounted on its side.

In an alternative embodiment of a particulate separator, a stationary separator (not shown) includes a set of inclined vanes by which increased air speed is achieved by moving air over the vanes. This cyclonic action results in the particles in the air stream dropping out and clean air exiting the particulate separator.

In addition to being upstream from the blower housing 12, a sample canister 52 can be positioned downstream from the blower housing. As seen in FIG. 5F a residual life indicating system generally referred to as a low pressure tap flow system is there disclosed. In this embodiment, a tap 50f is installed between the HEPA filter 40f and the carbon filter 42f. The tap 50f mounts to a first sidewall 24f of the filter housing 16f. The tap 50f communicates with a sample canister 52f which will be described in greater detail below. In use, contaminated air enters the inlet housing 10f and passes through the blower housing 12f and the air supply inlet hose 14f into the filter housing 16f. A sample of the air flows through the HEPA filter 40f and then through the tap 50f and into the sample canister 52f. The rest of the air flows through both the HEPA filter 40e and the carbon filter 42f and discharges through the outlets 34f. Positioning the tap 50f downstream the HEPA filter 40f inhibits large particulates from entering the sample canister 52f. Accordingly, a filter media residing in the canister will not have to capture the large particles that can be caught by the HEPA filter, leaving more free sites to capture the smaller contaminants. This provides more accurate results of the life remaining in the carbon filter 42f.

Figure 5H:
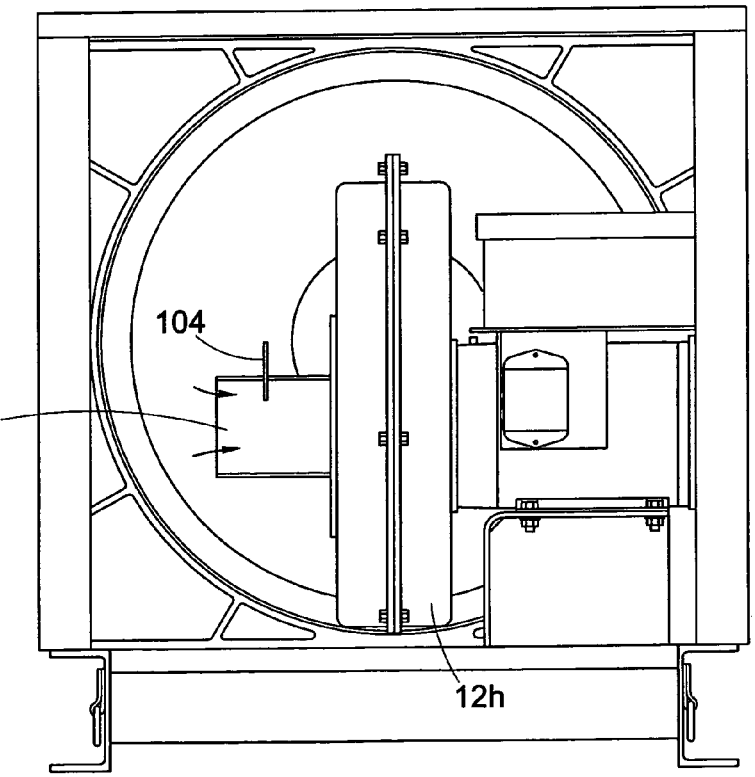
FIG. 5H is an end elevational view, partially in cross-section, of the gas purification assembly of FIG. 1 including another embodiment of a residual life indicating system according to the present invention mounted thereto.
Figure 5F:
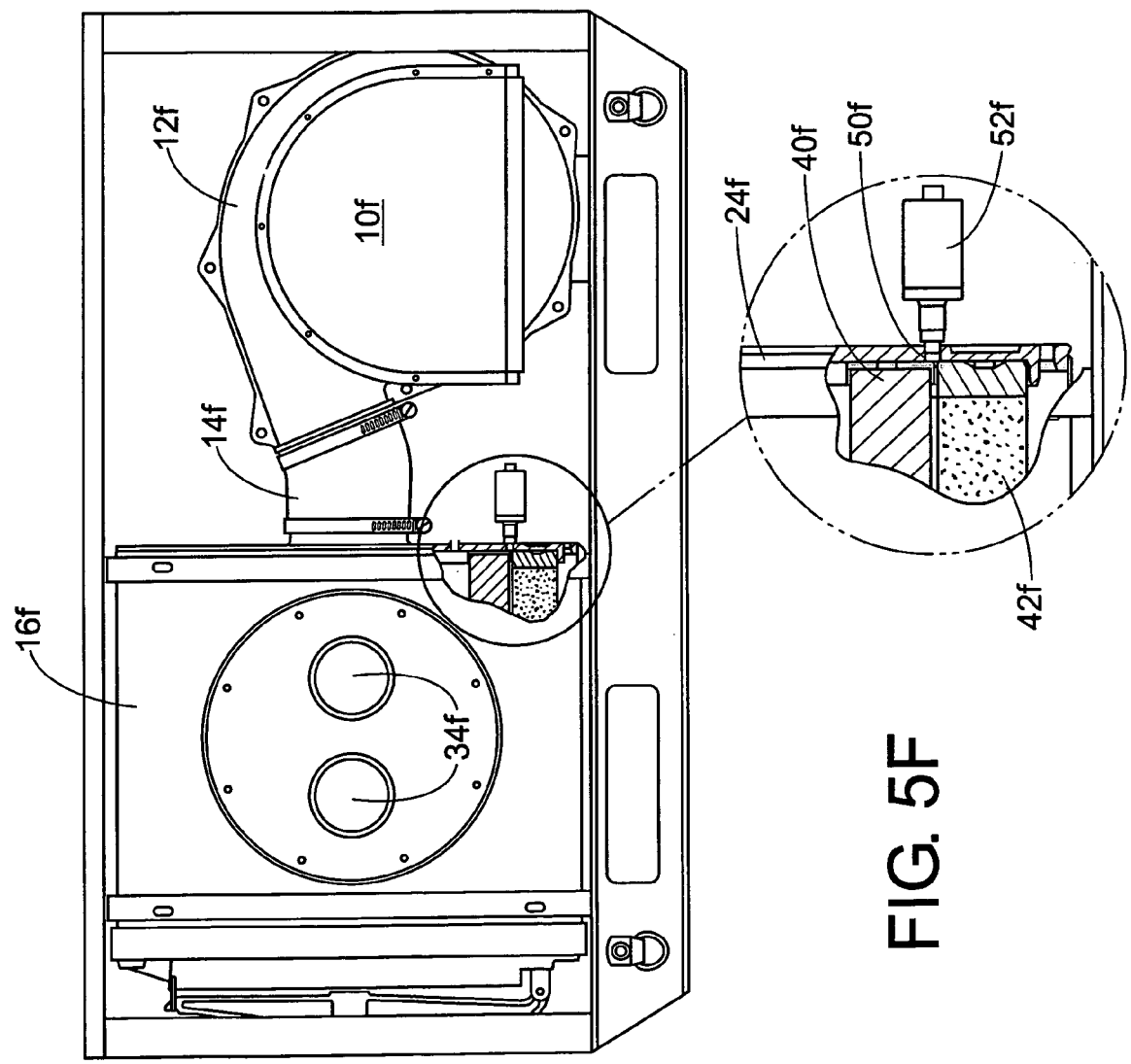
FIG. 5F is an enlarged side elevational view, partially in cross-section, of an alternative residual life indicating system.
Figure 5G:
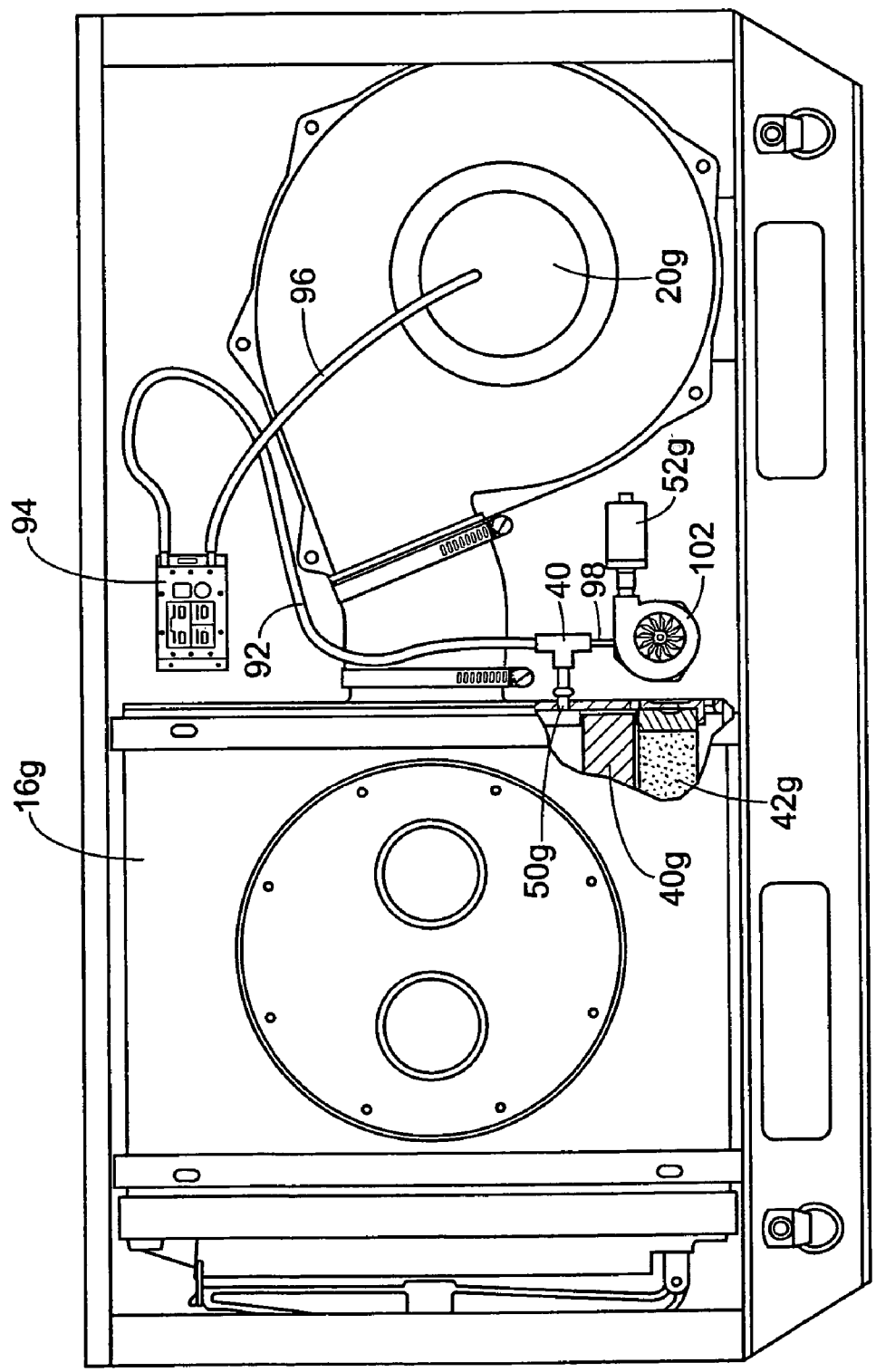
FIG. 5G is an enlarged side elevational view, partially in cross-section, of the gas purification assembly of FIG. 1 including another embodiment of a residual life indicating system according to the present invention mounted thereto.
Figure 6C:
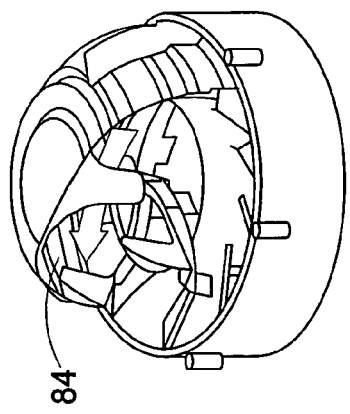
FIGS. 6A–6E are perspective views partially in cross-section of a particulate separator of the type employed in the assembly of FIG. 5E.
Figure 6B:
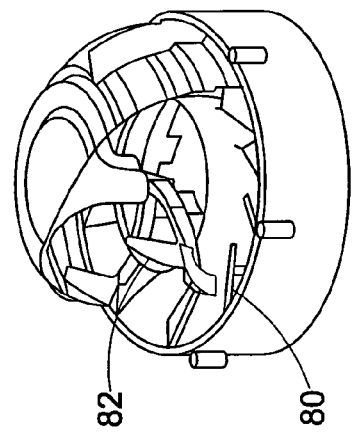
Figure 6A:
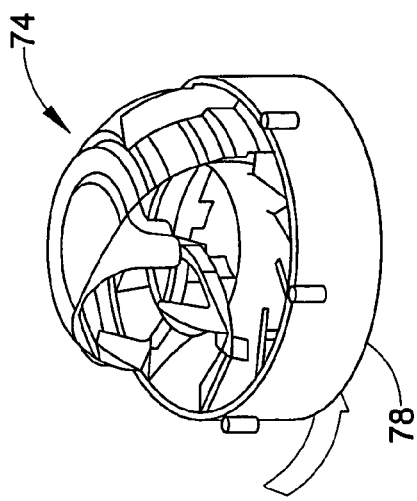
Figure 6E:
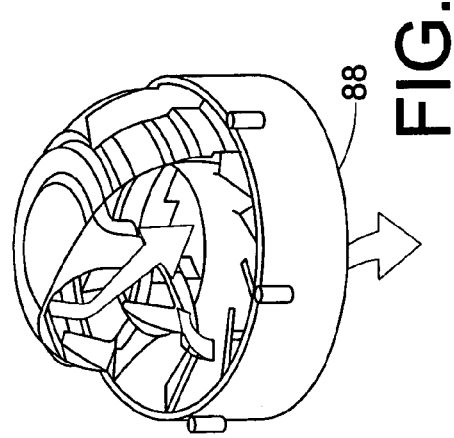
Figure 6D:
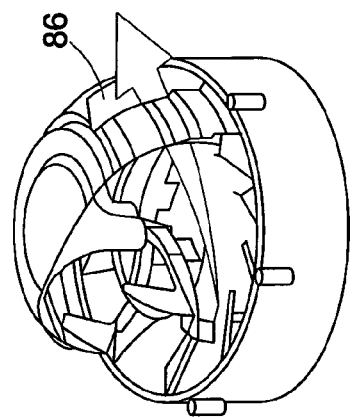

Referring now to FIG. 5G, a self-contained, stand-alone residual life indicator system according to yet another embodiment of the present invention is disclosed. In this embodiment, the volume and flow rate of air through a sampling device, such as a sampling canister, can be more accurately metered. In this embodiment, a tap 50g attaches to a filter housing 16g upstream from a HEPA filter 40g and a carbon filter 42g. The tap 50g in this embodiment, as well as others, can be situated anywhere on the filter assembly, so as long as it is upstream from the filters. The tap 50g communicates with tee connector 90. A first tube 92 connects the tee connector 90 with a sensor mounted on a remote processor 94. A second tube 96 connects the remote processor 94 to a contaminated air inlet 20g. An output wire 98 leads from the remote processor 94 through the first tube 92 to a separator fan 102. The separator fan 102 draws contaminated air from ambient providing air to a sample canister 52g. Speed of the separator fan 102 is regulated by the remote processor 94. The speed is dependent on the volume of airflow sensed by the remote processor via lines 92 and 96. A particulate separator similar to the one previously described above can be employed upstream from the sample canister 52g to separate large particles from the air stream prior to their entry into the canister. Of course a pressure sensor could be mounted in the tee connector 90 instead of on the remote processor 94 and communicate therewith by wiring in order to allow the pressure sensor to control the operation of the separator fan 102. Also, the remote processor 94 can communicate with the separator fan 102 via other means than the wire 98, for example via RF or IR transmission. Thus, with basic calculations, the remote processor can ensure that the proper amount of air passes through the sample canister 52g.

Referring to FIG. 5H, a mass flow sensor device 104 can be placed adjacent the air inlet 20h in the throat leading to the blower housing 12h. In FIG. 5H a hot wire, which measures the amount of air passing through a conduit by comparing the temperature of the wire at two different times, is placed in the throat. The hot wire communicates with a controller (such as the remote processor 94 in FIG. 5G), which communicates with a pump or blower. The pump communicates with a sample filter, which will be described in more detail below. From the measurements made on the hot wire, the mass flow of air entering the blower housing, which leads to the main filter, can be determined. The controller can operate the pump or blower to deliver a proportionate amount of the airflow mass to the sample filter.

Testing of the air will be described in more detail below.

FIGS. 7A and 7B schematically depict an alternative residual life indicating system for a filter assembly. For FIGS. 7A and 7B like components will be represented using like numerals and a letter suffix will be used corresponding to the figure number. An inlet 150a is provided anywhere upstream from the filter being monitored. The inlet communicates with a sample filter 152a, which can be similar to the sample canister 52 disclosed above and will be described in more detail below. An accumulator 154 is positioned downstream from the sample filter 152a and a sensor 156a is positioned downstream the accumulator 154. The air returns via an outlet 160a.

FIG. 7A shows an accumulator 154 also known as a concentrator, such as a thermal cyclic accumulator or a preconcentrator, as known in the art. Such a concentrator can be interposed between the sample filter 152a and the sensor 156a. The concentrator or accumulator is a device that provides increased compound concentrations to the sensor. In general, a concentrator adsorbs certain molecules in or onto an adsorbing media (such as a surface of a membrane or a column) from a gas inlet supply and can allow molecules of substances not of interest to pass through to an exhaust line. The adsorbing media is heated quickly, by a known heating element 158 (such as a resistance heater wrapped around the concentrator), as shown in FIG. 7A, to desorb the molecules of interest. The molecules are directed into the sensor 156a. The concentrator provides a strongly increased concentration of a chemical in a gas sample to the sensor, helping to overcome any reduction in sensitivity that may have accrued over time.

The use of a concentrator allows the molecules of interest present in a large air volume to be concentrated into a much smaller volume, increasing the probability of their detection by the sensor 156. Namely, the concentrator can check whether the sample filter has overflowed from gases in the sample air stream. Also, the concentrator can check whether the sample filter has overflowed by delivering a challenge gas, which will be described with reference to the embodiment of FIG. 7B. Even though a particular embodiment of a concentrator has been described, any known device that can concentrate molecules of a desired gas and deliver the molecules to the sensor can be used. For example, Sandia National Laboratories has employed in their μChem Lab system a preconcentrator in the form of a thin silicon nitride membrane supporting a patterned metal film heating element. The membrane is coated with a film to selectively, and reversibly, absorb analytes of interest.

The sensor 156a can detect chemicals and materials such as toxic industrial chemicals (TIC), toxic industrial materials (TIM) and chemical weapons. Many types of known sensors can be used as the sensor 156a. For example, the sniffer-STAR sensor system developed by Sandia National Laboratories in partnership with Lockheed Martin Corporation can detect certain types of chemical weapons, such as blister agents and nerve gases. Of course, there are many other types of known sensors which can detect one or more chemicals or materials.

With reference to FIG. 7B, downstream portions of an embodiment similar to FIG. 7A are shown. In this embodiment, a challenge gas can be delivered to a sample filter 152b. A sensor 156b detects whether the challenge gas has passed through the sample filter 152b. If the challenge gas is not detected by the sensor 156b, i.e., if the sample filter 152b has retained all the challenge gas, the sample filter is deemed to be empty. If the challenge gas is detected by the sensor 156b, i.e., the sample filter 152b has not retained all the challenge gas, the sample filter is full. Quantities between empty and full can be determined by using a mass flow orifice (FIGS. 5A–5H) and drawing a proportional amount of air through the sample filter 152b as compared to the main filter.

FIGS. 8A and 8B schematically depict another residual life indicating system for a filter assembly. For FIGS. 8A and 8B like components will be represented using like numerals and a letter suffix will be used corresponding the figure number. In FIG. 8A, a mass flow sensor/device 204a, which can be similar to the mass flow sensor device also referred to as a hot wire 104 disclosed in FIG. 5H, communicates with a controller 294a, which can be similar to the remote processor 94 described with reference to FIG. 5G. A blower or pump 202a, similar to the separator fan 102 described with reference to FIG. 5G, delivers air to be tested from an inlet 250a to a sample filter 252a. An accumulator 254a and a sensor 256a can be positioned downstream from the sample filter 252, before an outlet 260a.

As seen in FIG. 8B, downstream portions of an embodiment similar to FIG. 8A are shown. In this embodiment, a challenge gas can be introduced in a sample filter 252b, similar to the embodiment depicted in FIG. 7B. A sensor 256b detects whether the challenge gas has passed through the sample filter 252b. If the challenge gas is not detected by the sensor 256b, the sample filter 252b is deemed to be empty. If the challenge gas is detected by the sensor 256b, the sample filter 252b is deemed full. Quantities between empty and full can be determined by using a mass flow orifice (FIGS. 5A–5H) and drawing a proportional amount of air through the sample filter 152b as compared to the main filter using a device similar to the controller 294a disclosed in FIG. 8A, or a similar device.

Figure 9:
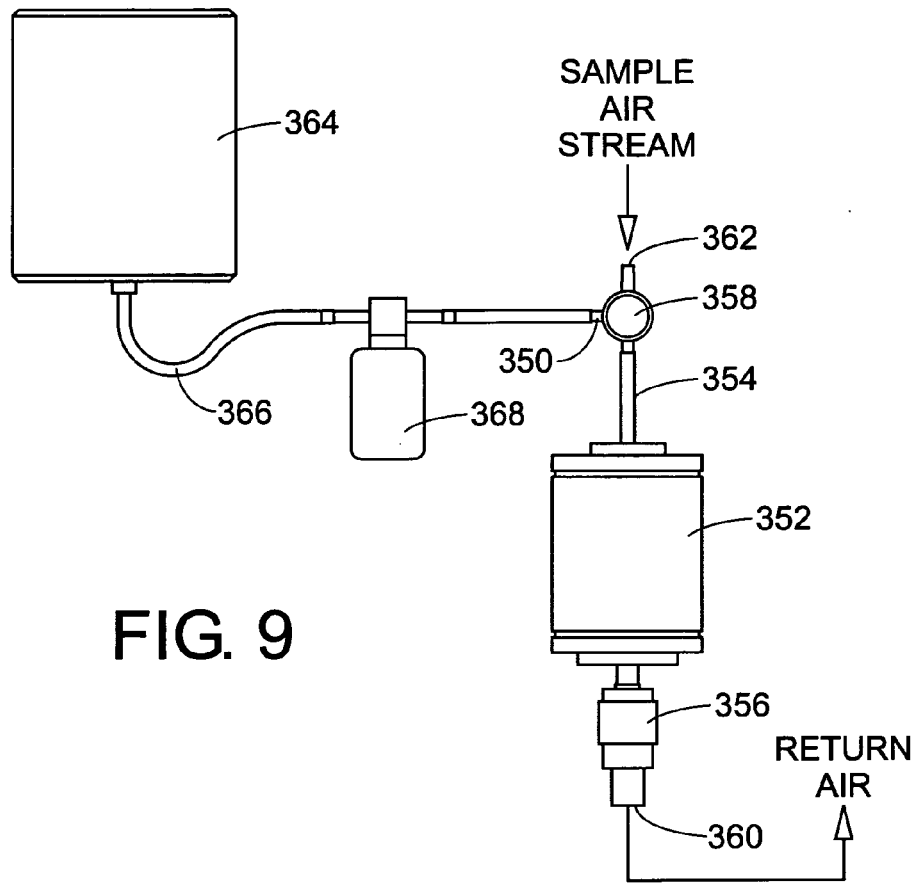
FIG. 9 is a side view of yet another embodiment of a residual life indicating system according to the present invention.
Figure 10:
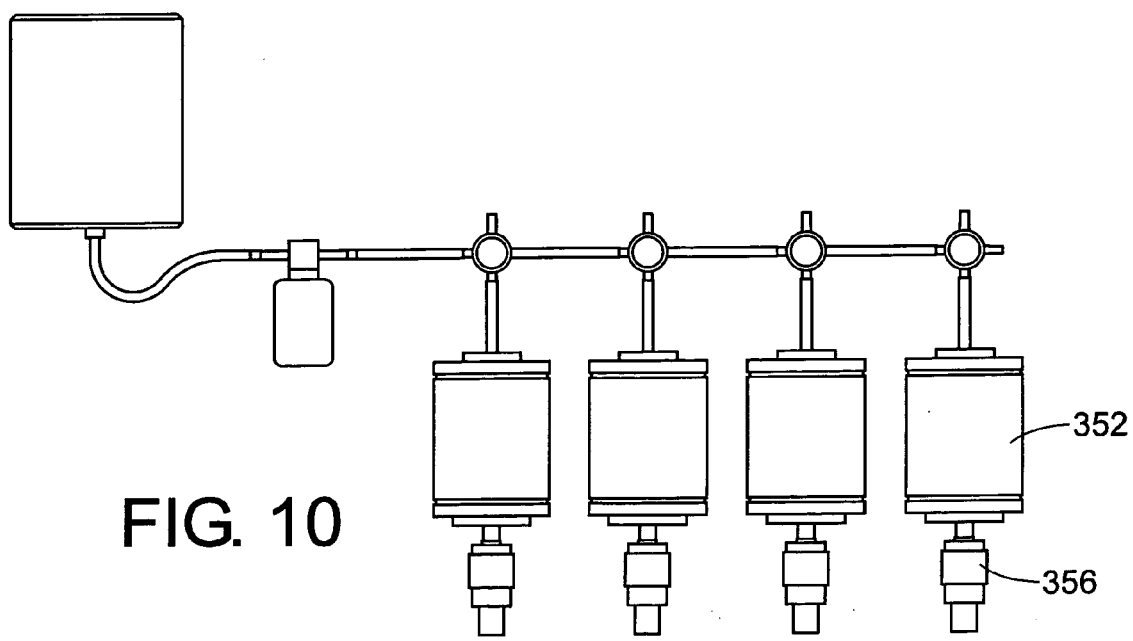
FIG. 10 is a side view of a further embodiment of a residual life indicating system according to the present invention.

With reference to FIG. 9, an alternative apparatus for detecting the life of a filter is disclosed. In the embodiment depicted in FIG. 9, a sample filter canister 352 is placed upstream from a sensor 356. The sensor can be any device that can detect the presence of a specific chemical or a family of chemicals. Some examples of such sensors include optical and adsorption types of sensors. FIG. 10 shows a plurality of sample filters 352 aligned in a parallel configuration. Since the basic testing method is the same for the embodiment depicted in FIG. 9, with the exception that the sample filters in FIG. 10 can have filter beds that either have different filtration materials or different amounts of a filtration material, or both, in this way, more information can be provided, the testing methods will be described with reference to FIG. 9.

The sample filter 352 receives air to be sampled from a conduit 354. The conduit 354 attaches to and communicates with a tee 358. The tee 358 receives sample air through an inlet 362, which communicates with a sample gas stream via, for example, the inlet tap 350 similar to taps described with reference to FIGS. 5A–5H. The tee 358 also communicates with a known gas source, which can be referred to as a challenge gas source 364, via a conduit 366. A regulator or metering device, such as a known metering solenoid 368, is disposed along the conduit 366 interposed between the challenge gas source 364 and the tee 358. The metering solenoid 368 can include a valve to control the flow of the challenge gas to the sample filter 352. The metering solenoid 368 controls the amount of challenge gas being delivered to the sample filter 352 or the rate at which it is delivered. The air passes through the sample filter 352 and through the sensor 354 before reentering the system through, for example the return 360.

Some sensors, in addition to identifying the gas or family of the gas, can also provide the concentration of the gas. However, sensors are prone sensitivity drift. In the case of a residual life indicating system where the life of the filter can be very long, such sensors would need to be recalibrated often to detect the amount of a certain substances. Recalibration, no matter if it is in a safe room or in the field, can be difficult. Recalibration is particularly difficult in the field where the filtration system, and the sensor, is exposed to fog, altitude, rain, cold, humidity, heat and other environmental variables. Furthermore, many gases may be detected but not interpreted correctly. By using the sample filter canister, the ability of recognizing what specific gas is being adsorbed by the main filter becomes less important. The concern is how much capacitance is remaining within the main filter, not the specific gas being adsorbed by the main filter.

At least two methods can be used to determine the life remaining in the main filter. One method determines the time at which the sample filter overflows, i.e. the sample filter no longer retains the gases of interest. In this method, a proportionate amount of sample air is delivered to the sample filter, as compared to the main filter. This can be accomplished using the systems described above with reference to FIGS. 5A–5G, 7 8, 9 and 10. When the sensor, which is located downstream from the sample filter, detects the gas of interest it is a signal that the sample filter is full, i.e., can no longer filter the chemical or material of interest. Since the sample filter is proportional in capacity to the main filter for the proportionate amount of air flow flowing through the sample filter, it can be inferred that the main filter is also at capacity.

Another method to test the capacity of the sample filter uses a known gas delivered in a metered quantity to the sample filter. The known gas or challenge gas is stored in a pressurized container at the challenge gas source. The metering solenoid can be used to deliver the desired amount of known gas. After the gas passes through the sample filter, the sensor detects whether the known gas has passed through the sample filter. If the known gas is not detected by the sensor, i.e. if the sample filter has retained all the known gas, the sample filter is deemed to be empty. If the known gas is detected by the sensor, i.e. the sample filter has not retained all the known gas, the sample filter is full. Quantities between empty and full can be determined by using a mass flow orifice (FIGS. 5A–5H) and drawing a proportional amount of air through the sample filter 552 as compared to the main filter.

A method to measure contaminants in the low parts per million (ppm) range includes a means of concentrating the gases in the sample canister. One way to achieve this is by passing two or more times the amount of airflow through the sample canister than passes through the main filter set. At a predetermined time the sample canister will be heated to drive off the adsorbed gases, if any, providing a higher concentration than would be present if the sample canister airflow was at the same rate as the filter set. The increase of airflow through the sample canister can be proportional to the filter set by use of a pressure differential creating device such as an orifice of the type described above.

Two or more of these sampled air concentrating steps can be employed to provide the ability to base line the first sample canister. An example would be that the first canister is heated and sampled every 6 hours. If the gas level detected is none or below a predetermined level, no further action is taken and the canister is put back on line. If during the second sampling of the same canister the gas level exceeds the minimum level, a second canister will be heated and checked. The second canister has never been sampled and contains the total amount of retained gases. The second canister will provide a more realistic sample due to the fact that it never had been purged. This data will update a conventional microprocessor (not shown) for further action.

By the use of the sample filter, the ability of recognizing what specific gas is being adsorbed by the appliance filter becomes less important. The concern is how much capacitance is remaining within the appliance filter set, not what has been adsorbed. Since the sample filter is a direct representation of the main appliance filter and the sample filter has presented a full condition, the identification of the specific gas adsorbed is less critical. The remaining capacitance needs to be identified and by having the ability to query additional sample filters as needed, the remaining capacitance can be found.

Another approach to determining the residual life remaining in the main filter can account for "self cleaning" of the main filter. During continuous use, a carbon filter can slowly release what has been adsorbed. By way of example only, consider an automobile positioned near the air inlet of a filter system. While the automobile is near the inlet, fumes from the automobile are being adsorbed by the main filter and the sample filter. When the automobile has moved away from the air inlet, cleaner air passes through the filters. When enough "clean" air passes through the filters, some of the automobile fumes that were adsorbed can be slowly released by the filters. The low concentration of released gases may not be noticed by smell and if the system has not been presented with a triggering event, such as a chemical attack, the fumes would be deemed safe. This "self cleaning" increases the capacity of the main filter and it is desirable for the sample filter to account for this.

To compensate for the dynamic loading of the main filter, a method of determining the residual life of the main filter would query the sample filter. If the sample filter has indicated that it is full, e.g. the sensor detects a certain gas, the sample filter can be queried after a certain period of time. If at the second query the sample filter indicates no overflow, it can be assumed that the sample filter is full, but not overflowing. The next query that results in an overfilled condition will have compensated for any changes during filter operation because the sample filter draws a proportionate amount of air through sample filter when compared to the main filter. It is important to insure the linearity of response of the sample filter. One way of doing this is by controlling the inlet orifice for the sample filter.

A controller (FIG. 8A) can provide control functions, signal processing, data collection, data analysis, operator interface status and control. The controller, or microprocessor, provides operation and control of the known gas delivered to the sample filter, by controlling the metering solenoid 568. The controller can also provide control and operation of the concentrator, described above. Moreover, the controller is also connected to the sensor. Continuous main filter status can be provided to an operator and during a known gas attack the operator can have the ability to automatically increase the sample filter query rate. It should be apparent from FIG. 8A that the operator can program the controller via an operator control panel 296.

The different canisters and sample filters disclosed above, and which will be described in more detail below, can be used with each residual life indicating system disclosed, as well as with other residual life indicating systems. Furthermore, the canisters can be configured in series or in parallel in the residual life indicating systems as discussed in relation to FIGS. 9 and 10. Also, different types of canisters can be employed in the same system, dependent upon the type of data the user of the residual life indicating system wishes to analyze.

Figure 11:
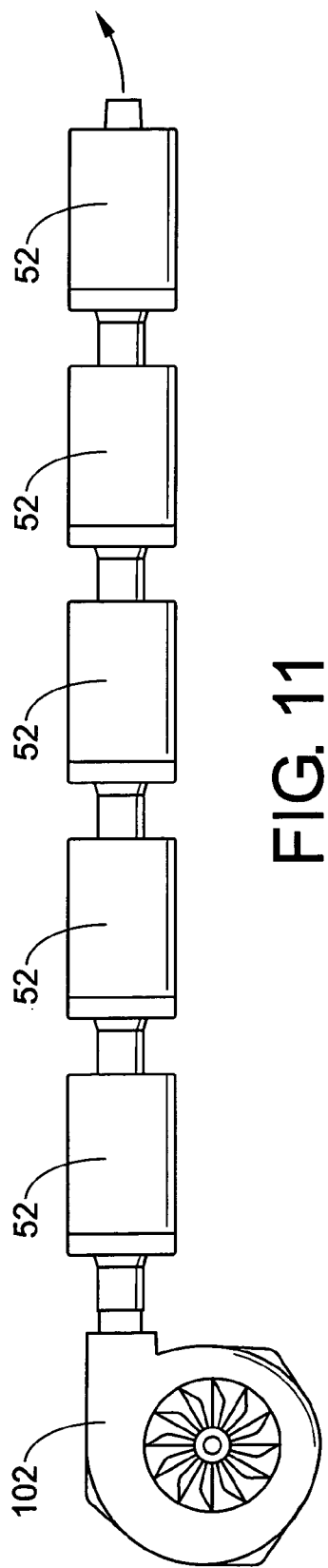
FIG. 11 is an elevational view of a set of canisters mounted in series that can be employed in a residual life indicating system according to the present invention.
Figure 12:
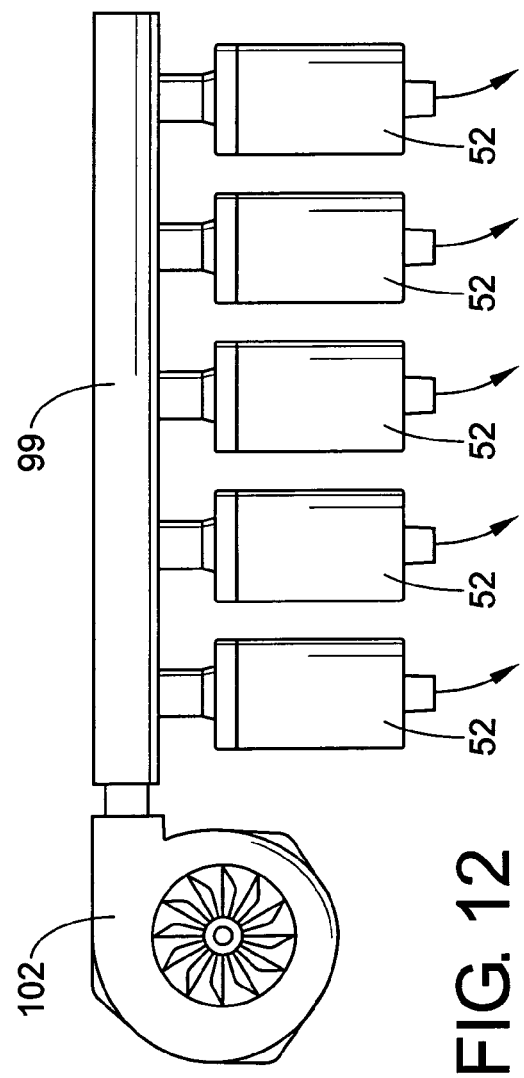
FIG. 12 is an elevational view of a set of canisters mounted in parallel that can be employed in a residual life indicating system according to the present invention.

Referring now to FIGS. 11 and 12, with the exception of FIG. 10 only one canister has been discussed in the above-mentioned residual life indicator systems. However, a plurality of canisters can also be employed with each of the above-described systems. For example, as shown in FIG. 11 the sample canisters 52 can be arranged in series with a blower 102 supplying contaminated air to the canisters. As shown in FIG. 12, the blower 102 can communicate with a tube 99 such that the canisters 52 can be arranged in parallel.

Figure 13:
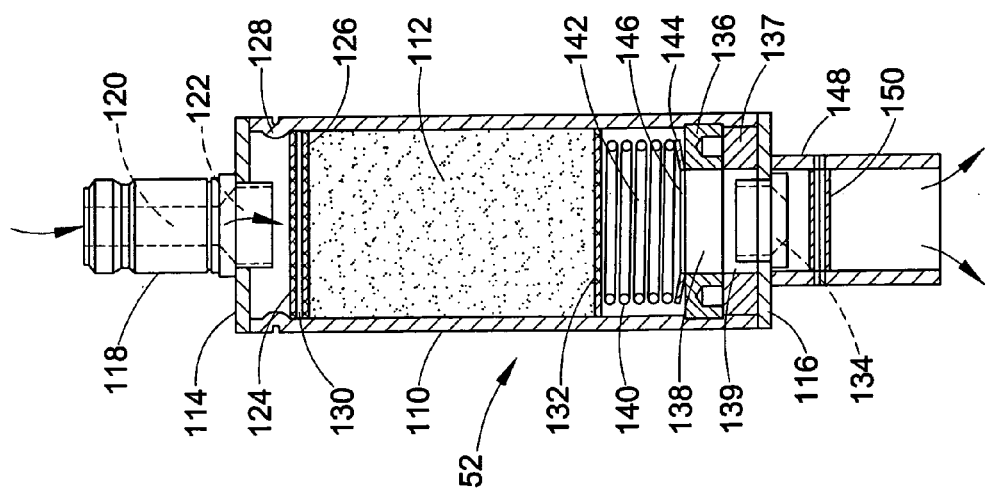
FIG. 13 is a cross-sectional view of a surrogate sample canister that can be employed in a residual life indicating system according to the present invention.

Referring now to FIGS. 13–20, various embodiments of a sample canister will be described with more particularity. Referring specifically to FIG. 13, the canister 52 includes a side wall 110 surrounding a granulated filter media 112. An inlet end plate 114 and an outlet end plate 116, each attached at an opposite end of the canister, further define a housing for the filter media. A nipple 118 is attached to the inlet plate 114. The nipple defines an inlet opening 120 which communicates with an opening 122 in the inlet plate 114. An upper screen arrangement, including first and second perforated walls 124 and 126, retains the filter media inside the canister 52 so that the filter media cannot escape through the inlet 122. A toroidally extending dimple 128 in the side wall 110 prevents the perforated wall 124 from approaching the opening 122. A thin planar HEPA filter 130 can be interposed between the perforated walls 124 and 126. The HEPA filter can filter large impurities in the air stream prior to its entry into the sample canister. A lower screen 132 retains the filter media 112 inside the canister at its lower end. An outlet 134 is defined in the outlet plate 116.

To keep the granulated filtering material under compression, a biasing assembly can be used. The biasing assembly can comprise a toroidal washer gasket 136 having a centrally located aperture 138. A second washer 137 having a central aperture 139 can be disposed below the first washer 136 and above the outlet plate 116. Supported on the gasket and acting against the lower screen 132 is a biasing member 140 similarly including a central aperture 142. In one embodiment, the biasing member can be a coil spring. The biasing member biases the lower screen 132, the filter media 112, and the first and second perforated walls 124 and 126 toward the dimple 128. A Belleville washer 144 having a central aperture 146 can be interposed between the biasing member 140 and the washer 136. In an alternate embodiment, a plurality of Belleville washers can be stacked upon one another to comprise the biasing member.

Contaminated air enters the canister 52 via the inlet 120 in the nipple 118. The air flows through the nipple 118 and through the inlet 122 in the inlet plate 114. The air flows then through the HEPA filter 130 and then the granulated filter media 112. The filtered air the flows through the biasing assembly. The filtered air exits the canister 52 through the outlet 134 in the outlet plate 116 and enters a duct 148 where a sensor 150 can be positioned. Of course, the sensor or sensors could be positioned in a variety of other locations, either in the filter canister or at a remote location. The sensor is electronically connected (not shown) to a remote processor (similar to the controller 294 in FIGS. 8A–8B). The sensor can also communicate with any other known processing unit (not illustrated) as well. The sensor 150 can detect whether any contaminants have passed through the filter media 112, which would indicate failure. The sensor communicates this information to the remote processor, or other processing unit.

Those skilled in the art will recognize that suitable sensors could also be positioned at the inlet to the sample canister or the inlet to the blower housing if so desired to sense an ambient condition for reference. For example, the sensor could be employed to sense toxic industrial chemicals or materials or military chemical agents.

The filter media 112 comprises the same or a similar media as the carbon filter 42 in the air purification assembly discussed above. The filter media can also be a mobilized bed of activated carbon, or the like, the advantage of which is that the filter bed can be poured into the canister. The filter media can also comprise an immobilized bed of granular material, where the media is fixed in place using some sort of adhesive. The filter media can also comprise a pleated cloth containing activated charcoal or the like. When using the latter types of filter media, other types of biasing assemblies, such as a felt pad or an o-ring may be adequate. The dimensions of the filter media 112 are a function of the information that the user of the residual life indicating system would like to receive. For example, the filter media 112 can be proportional to the width of the carbon filter 42 in the filter housing 16 (FIGS. 1–4). Accordingly, if the filter media 102 is ¼ the width of the carbon filter 42 and the filter media 112 is exhausted, everything being linear, the filter 42 is one fourth spent.

Figure 16:
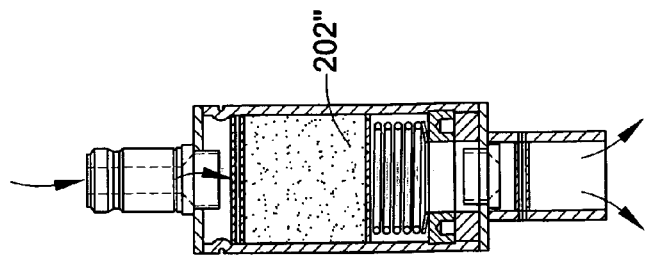
FIGS. 14–16 are cross-sectional views of non-surrogate sample canisters that can be employed in a residual life indicating system according to the present invention.
Figure 15:
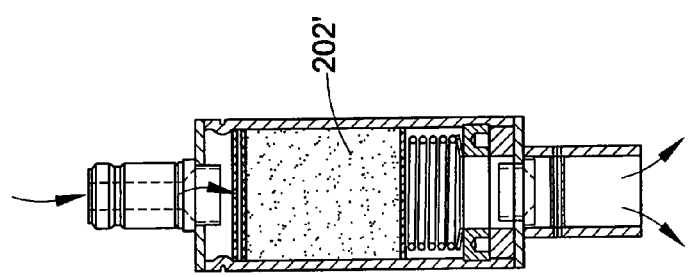
Figure 14:
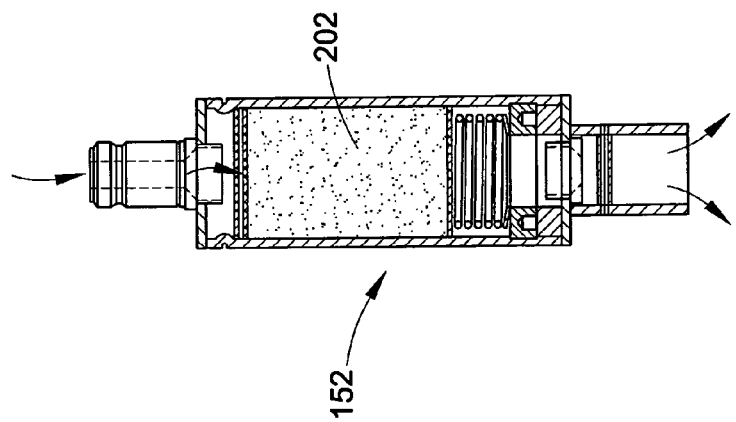

Referring now to FIG. 14–19, several embodiments of a non-surrogate canister are there disclosed. Referring to FIGS. 14–16, a non-surrogate canister 152 is not designed to mimic the filter by breaking through at the same rate as the actual filter. Rather the non-surrogate canister is designed to sense breakthrough after exposure to a specified concentration of components over a specified period of time. A filter media 202 can comprise loose granular, bonded granular, woven or hard packed types of filter media. For example, loose granular filtration material, such as activated charcoal can be used. Various non-surrogate canisters can be designed and used in parallel or series configuration, as shown in FIGS. 12 and 13. For example, a 60 minute, a 30 minute, a 15 minute, a 10 minute, and a 5 minute canister could be used on a single system to identify the level of exposure the filter has seen. As shown in FIG. 14 the depth of the filter media 202 is greater than the depth of the filter media 202' and 202" shown in FIGS. 15 and 16 respectively. Accordingly, the filter media 202 in FIG. 14 adsorbs more contaminants than the filter media 202' and 202" in FIGS. 15 and 16. According to the breakthrough of the different canisters, the residual life of the filter in the air purification system can be determined.

Figure 19:
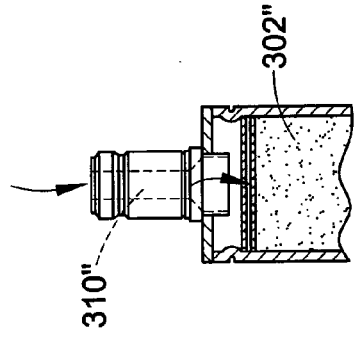
FIGS. 17–19 are cross-sectional views of a top portion of non-surrogate sample canisters that can be employed in a residual life indicating system according to the present invention.
Figure 18:
Figure 17:
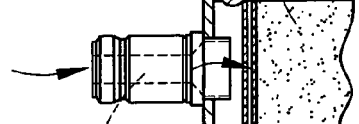

Referring now to FIGS. 17–19, non-surrogate canisters having a varied inlet diameter are disclosed. Referring to FIG. 17, a non-surrogate canister 252 includes an inlet 310 which allows less airflow to enter the canister 310 as compared to inlet 310' and 310" as shown in FIGS. 18 and 19. Accordingly, less airflow enters the filter media 302 of FIG. 17 than the filter media 302' of FIG. 18. Furthermore, less airflow enters the filter media 302' of FIG. 18 than 302" of FIG. 19. The smaller the inlet, the longer the break through time. Residual life can be determined from these canisters 352 in a similar manner as those described in FIGS. 14–16.

Figure 20:
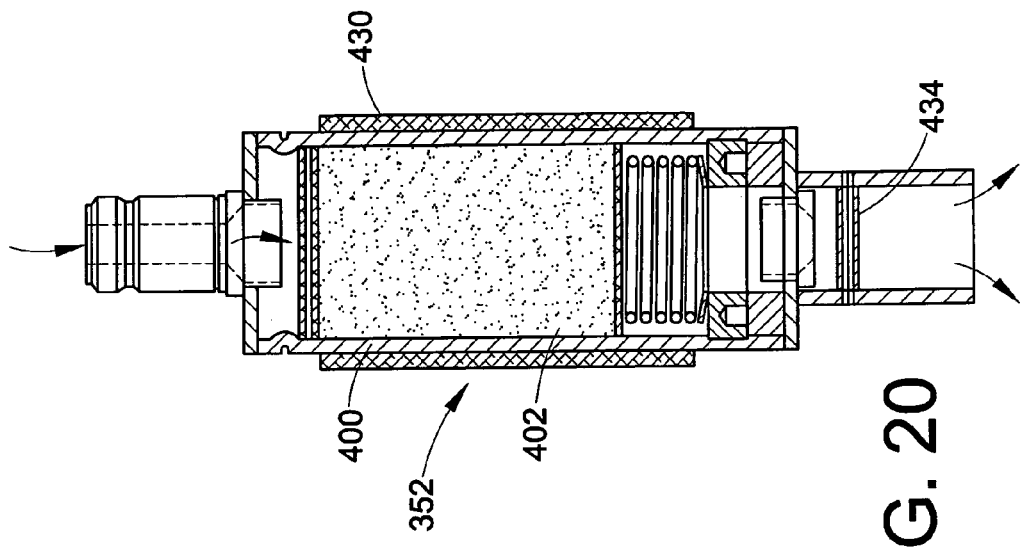
FIG. 20 is a cross-sectional view of a thermal cyclic sample gas accumulator canister that can be employed in a residual life indicating system according to the present invention.

Referring now to FIG. 20, a heat sleeve 430 surrounds a side wall 400 of a canister 352. The canister 352 is filled with adsorbent material or filter media 402. The filter media 402 is heated by the heat sleeve 430. When the filter media is heated, contaminants that were locked in the filter media are dislodged and released. When a stream of air is sent through the heated canister 352, it forces the released contaminants through. The heated filter media serves to increase the concentration of contaminants to such a level that a sensor 434 can accurately pick up the contaminants.

The invention has been described with reference to several preferred embodiments. Obviously, modifications and alterations will occur to others upon reading and understanding the preceding detailed description. It is intended that the invention be construed as including all such modifications and alterations as fall within the scope of the appended claims and the equivalents thereof.

What is claimed is:

1. A residual life indicating system for a filter, comprising:
    a main filter;
    a first sampling filter, wherein said main filter and said first sampling filter both receive an ambient gas meant to be filtered;
    a sensor positioned downstream from said first sampling filter wherein said sensor senses the presence of a predetermined chemical in the gas which has been filtered by said first sampling filter; and a second sampling filter, spaced from said first sampling filter, wherein said second sampling filter is in series with said first sampling filter.

2. The system of claim 1 further comprising a heater mounted to said first sampling filter for heating same.

3. The system of claim 1 further comprising a microprocessor electrically connected to said sensor.

4. The system of claim 1 further comprising a gas source for supplying a gas to said main filter and said first sampling filter.

5. The system of claim 1 wherein said main filter has a volume which is larger than a volume of said first sampling filter.

6. A residual life indicating system for a filter in a gas purification assembly, comprising:

a main filter;

a sampling filter spaced from said main filter, wherein said main filter and said sampling filter each receive an ambient gas meant to be filtered;

an accumulator located downstream from said sampling filter and in fluid communication therewith;

a heater mounted to said accumulator for heating same; and a sensor connected to said accumulator, said sensor sensing the presence of a predetermined chemical in the gas which has been filtered by said sampling filter and has entered said accumulator.

7. The system of claim 6 wherein said sensor is positioned downstream from said accumulator.

8. The system of claim 6 further comprising a microprocessor electrically connected to said sensor.

9. The system of claim 6 further comprising a second sampling filter, spaced from said first sampling filter.

10. The system of claim 9 wherein said second sampling filter is in series with said first sampling filter.

11. The system of claim 9 wherein said second sampling filter is in parallel with said first sampling filter.

12. The system of claim 6 further comprising a gas source for supplying a gas to said main filter and said sampling filter.

13. The system of claim 6 wherein said accumulator has a volume which is smaller than a volume of said sampling filter.

14. The system of claim 6 wherein said sampling filter has a volume which is smaller than a volume of said main filter.

15. An air purification assembly comprising:

a housing defining an air flow path;

an air pressurizing member located in said housing along said air flow path for supplying pressurized ambient air;

a main filter located in said air flow path for filtering the pressurized ambient air flowing along said air flow path;

a first sampling filter in fluid communication with said air flow path via an orifice for sampling the pressurized ambient air;

a second sampling filter, spaced from said first sampling filter, wherein said second sampling filter is in series with said first sampling filter;

a sensor communicating with said first sampling filter for sensing the presence of a predetermined chemical in the air exiting said first sampling filter.

16. The system of claim 15 further comprising a heater mounted to said sampling filters for heating same.

17. The system of claim 15 wherein said sensor is positioned downstream from said sampling filters.

18. The system of claim 15 further comprising a microprocessor electrically connected to said sensor.

19. The system of claim 15 wherein said main filter has a volume which is larger than a volume of said sampling filters.

20. A residual life indicating system for a filter, comprising:

a main filter;

a sampling filter, wherein said main filter and said sampling filter both receive an ambient gas meant to be filtered;

a supply of a pressurized challenge gas;

a conduit for connecting said challenge gas supply to said sampling filter;

a regulator for regulating a flow of the challenge gas to said sampling filter, wherein said regulator comprises a metering solenoid; and, a sensor located downstream from said sampling filter wherein said sensor senses the presence of a predetermined chemical in the gas which has been filtered by said sampling filter.

21. The system of claim 20 further comprising a microprocessor electrically connected to said sensor.

22. The system of claim 21 wherein said microprocessor is electrically connected to said metering solenoid.

23. The system of claim 22 further comprising a valve which is located in said conduit for regulating a flow of the ambient gas and the challenge gas to said sampling filter.

24. The system of claim 23 wherein said microprocessor is electrically connected to said valve.

25. The system of claim 24 further comprising a second sampling filter, spaced from said first sampling filter.

26. The system of claim 25 wherein said second sampling filter is in series with said first sampling filter.

27. The system of claim 25 wherein said second sampling filter is in parallel with said first sampling filter.

* * * * *